Oct. 9, 1956     E. P. WHITLOW     2,765,634
REFRIGERATION
Filed Dec. 29, 1954
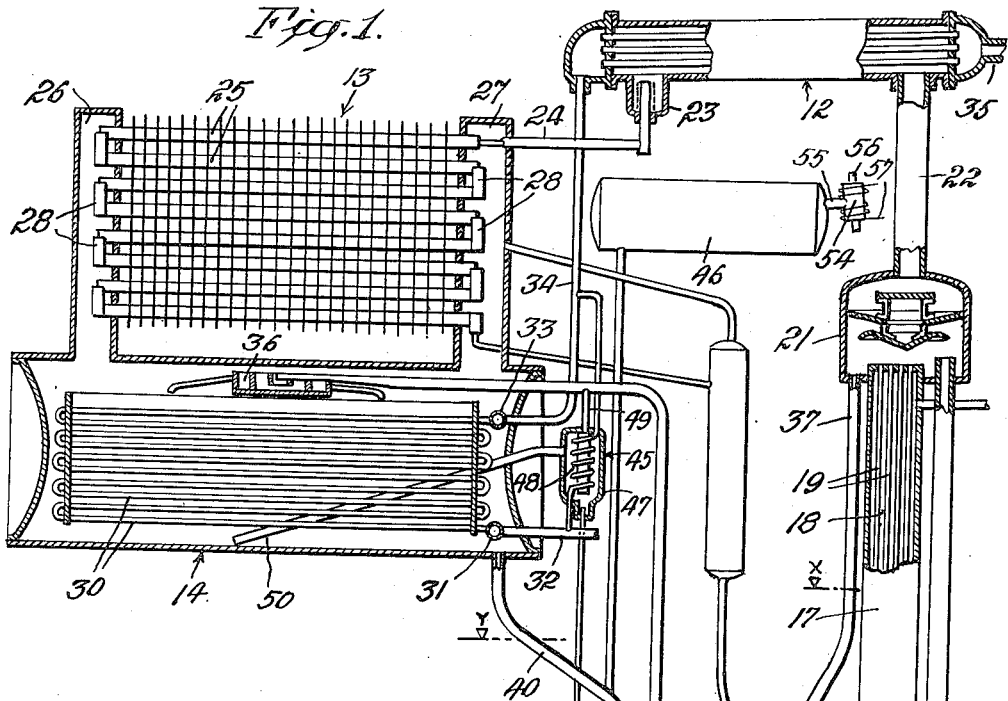
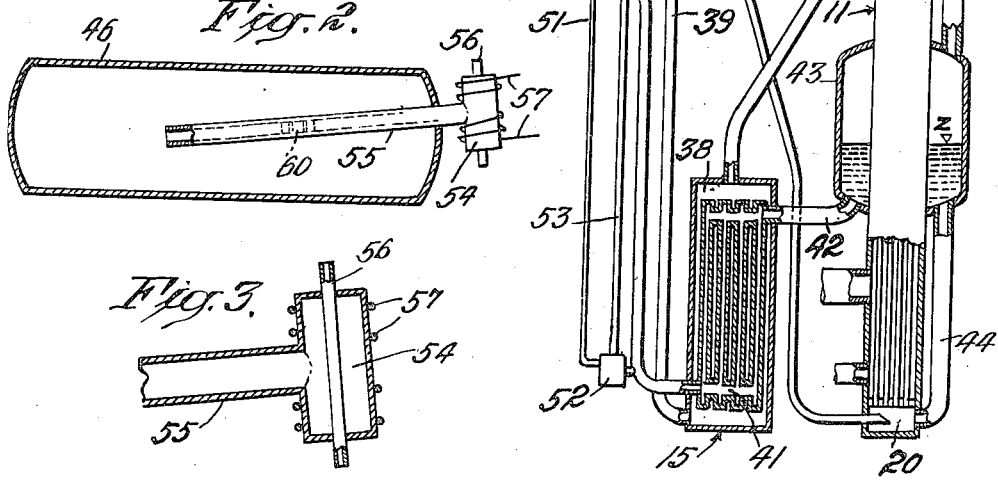
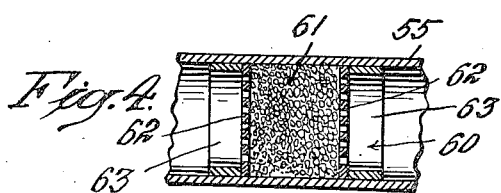
INVENTOR.
Eugene P. Whitlow
BY
Oliver S. Titcomb
his ATTORNEY

United States Patent Office 2,765,634
Patented Oct. 9, 1956

2,765,634

REFRIGERATION

Eugene P. Whitlow, Evansville, Ind., assignor to Servel, Inc., New York, N. Y., a corporation of Delaware Application December 29, 1954, Serial No. 478,294

7 Claims. (Cl. 62—119)

The present invention relates to refrigeration and more particularly to purging hydrogen from closed refrigerating apparatus.

While the present invention may have other applications, it is particularly adapted for apparatus used in vacuum type absorption refrigeration systems. Such systems using water as a refrigerant and a salt solution for an absorbent have been used extensively for air conditioning. Hydrogen is apt to occur in the apparatus which probably results from corrosion and, due to the low pressure in the apparatus, a small quantity of non-condensable hydrogen blankets a large area of heat transfer surface with an insulating layer. It has heretofore been the practice to continuously transfer hydrogen from the active parts of the apparatus to a storage vessel having a palladium wall through which the hydrogen diffuses to the ambient atmosphere. However, if the palladium wall is contacted by absorbent, as may occur from tipping or tilting the apparatus during transit, the palladium wall becomes contaminated or poisoned which prevents the diffusion of hydrogen therethrough.

One of the objects of the present invention is to provide a trap between the palladium wall and other parts of the apparatus which permits the flow of hydrogen while preventing the flow of liquid therethrough.

Another object is to provide a trap of the type indicated which utilizes the resistance of closely packed granules of a non-wetting material to prevent the penetration or flow of liquid therethrough.

Another object is to provide a trap in a closed refrigerating apparatus for preventing contact of absorption solution with a palladium wall which is of simple and compact construction, economical to manufacture and reliable in operation.

These and other objects will become more apparent from the following description and drawing in which like reference characters denote like parts throughout the several views. It is to be expressly understood, however, that the drawing is for the purpose of illustration only and not a definition of the limits of the invention, reference being had for this purpose to the appended claims. In the drawing:

Fig. 1 is a diagrammatic view of the apparatus used in a vacuum type absorption refrigeration system and showing the purging arrangement for automatically purging hydrogen from the system;

Fig. 2 is an enlarged view showing the trap between a gas storage vessel and gas diffusion cell and which is permeable to hydrogen and impermeable to liquids;

Fig. 3 is a further enlarged view of the gas diffusion cell from which hydrogen is diffused through a palladium wall to the ambient atmosphere; and Fig. 4 is an enlarged view of the trap shown as comprising closely packed granules of a non-wetting material.

Referring to the drawings, the invention is shown applied to a vacuum type absorption refrigeration unit generally similar to that illustrated and described in an application for United States Letters Patent of E. M. Stubblefield, Serial No. 265,418 filed January 8, 1952, now Patent No. 2,730,869 granted January 17, 1956. Suffice it to state herein that the refrigeration apparatus comprises a generator 11, a condenser 12, an evaporator 13, an absorber 14, and a liquid heat exchanger 15. The elements are interconnected to provide a closed system that is initially evacuated and charged with a water solution of lithium bromide or other suitable refrigerant and absorbent combination.

The generator 11 comprises a shell 17 forming a heating chamber 18 enclosing upright tubes 19. The generator tubes 19 extend between a lower inlet chamber 20 and an upper separating chamber 21. Steam supplied to the heating chamber 18 at atmospheric pressure expels refrigerant vapor, water, from the lithium bromide solution in the upright tubes 19 and the expelled vapor is utilized to raise the solution for gravity flow through the solution circuit as later explained.

Refrigerant vapor flows from separating chamber 21 through a vapor pipe 22 to the condenser 12 where it is liquefied. The condenser 12 may be of any suitable kind such as a surface type having a shell and tubes through which cooling water flows. Liquid refrigerant flows from the condenser 12 to the evaporator 13 through an orifice device 23 and conduit 24. The orifice device 23 is like that described and claimed in United States Letters Patent of N. E. Berry 2,563,575 issued August 7, 1951, which permits the flow of liquid and non-condensable gases from the condenser 12 to the evaporator 13 while maintaining a difference in pressure therebetween.

The evaporator 13 comprises horizontally arranged finned tubes 25 arranged one over the other and extending between headers 26 and 27. The tubes 25 project into the headers 26 and 27 and adjacent tubes have cups 28 at opposite ends which underlie the ends of the next uppermost tube so that refrigerant flows through successive tubes from the top to the bottom of the evaporator. Evaporator 13 is mounted on the absorber 14 with the headers 26 and 27 opening into the top thereof.

Absorber 14 comprises a generally cylindrical shell having a plurality of horizontally arranged tubes 30 with the ends of adjacent tubes connected together in vertical rows to provide serpentine coils. The lower ends of the plurality of serpentine coils are connected together by a header 31 which, in turn, is connected to a cooling water inlet conduit 32. The upper ends of the vertical coils are connected together by a header 33 and the header is connected by a conduit 34 to one end of the condenser 12 for delivering cooling water for flow through the tubes thereof. A conduit 35 is provided at the other end of the condenser 12 from which cooling water can flow to waste or a cooling tower if one is used. Thus, cooling water flows successively through the tubes 30 of the absorber 14 and condenser 12. Overlying the tubes 30 in the absorber 14 is a liquid distributor 36 for distributing liquid onto the uppermost tube of each coil from which it drips onto the next lowermost tube from the top to the bottom of the absorber.

The absorption solution circuit comprises a path of flow for solution weak in refrigerant from the generator 11 to the absorber 14 and a path of flow for solution strong in refrigerant from the absorber to the generator. The path of flow for solution weak in refrigerant comprises a conduit 37 depending from the separating chamber 21 and connected to the outer passage 38 of the liquid heat exchanger 15 and a conduit 39 connecting outer passage of the heat exchanger to the liquid distributor 36 overlying the tubes 30 in absorber 14. The path of flow for solution strong in refrigerant comprises a conduit 40 depending from the absorber shell 14 and connected to the inner passage 41 of the heat exchanger. A conduit 42 connects the inner passage 41 of liquid heat exchanger 15 to a reservoir vessel 43 which, in turn, is connected to the inlet chamber 20 of the generator 11 by a conduit 44 to complete the solution circuit. Thus, solution lifted in the generator tubes 19 to the separating chamber 21 flows by gravity through the absorber 14, heat exchanger 15 and reservoir vessel 43 back to the base of the generator to complete a cycle.

Absorption solution flowing over the relatively cold tubes 30 in the absorber 14 absorbs refrigerant vapor and causes the refrigerant to evaporate in the tubes 25 of the evaporator 13 at a low pressure and temperature to cool air flowing over the exterior of the tubes. The difference in pressure between the condenser 12 and evaporator 13 is maintained by the orifice device 23 and the difference in pressure between the absorber 14 and generator 11 is maintained by pressure balancing columns of solution in the conduits 39 and 40. For example, solution will stand at some level X in conduit 37 during operation to maintain a pressure balancing liquid column in conduit 39 connected thereto through the outer passages 38 of the liquid heat exchanger 15, and will stand at levels Y and Z in conduit 40 and reservoir vessel 43, respectively, to maintain a pressure balancing column therebetween.

A purging device 45 like that described and claimed in United States Letters Patent to C. A. Roswell Re. 23,093 reissued March 22, 1949 is provided to continuously withdraw non-condensable gases such as hydrogen from the active parts of the system and transfer the gas to a gas storage vessel 46. The purging device 45 comprises an auxiliary absorber 47 having a cooling coil 48 therein connected between the cooling water inlet and outlet conduits 32 and 34. Absorption solution weak in refrigerant flows from conduit 39 through a branch 49 into the auxiliary absorber 47 for flow over the cooling coil 48. A suction tube 50 extends from the bottom and center of the absorber vessel 14 to the side of the auxiliary absorber 47 and a fall tube 51 depends from the auxiliary absorber to a separating chamber 52 at the base of the apparatus. Separating chamber 52 is connected to conduit 40 in the path of flow from absorber 14 to generator 11 and a riser conduit 53 connects the top of the separating chamber to the gas storage vessel 46. A gas diffusion cell 54 communicates with the gas storage vessel 46 through a tube 55 and has a wall 56 of palladium through which hydrogen diffuses from the closed apparatus to the ambient atmosphere. The palladium wall 56 is illustrated in the form of a tube extending in a generally vertical direction through the gas diffusion cell 54. As thus far described, the apparatus is substantially identical with that illustrated and described in the Stubblefield application referred to above.

In accordance with the present invention a trap 60 is provided for preventing absorption solution from contacting the palladium wall or tube. The trap 60 may be located anywhere between the palladium wall or tube 56 in the gas diffusion cell 54 and the liquid solution containing elements of the apparatus and may comprise any suitable material which is permeable to hydrogen and impermeable to absorption solution. In the illustrated embodiment the trap 60 is located in the tube 55 connecting the gas storage vessel to the diffusion cell 54. The tube 55 has an open end at the center of the gas storage vessel 45 and projects outwardly through the wall of the vessel with its opposite or outer end opening into the closed gas diffusion cell 54. A heating coil 57 surrounds cell 54 and is energized during operation of the refrigeration system to heat the palladium wall 56 and increase the rate of hydrogen diffusion.

As shown in Figs. 2 and 4 of the drawing, the trap 60 comprises closely packed granules 61 of a non-wetting material and the granules are of such size that the surface tension of the liquid resists flow through the small interstices between adjacent granules. Suitable non-wetting materials may comprise polymers of fluorinated hydrocarbons. More specifically, the materials may comprise a polymer of a fluorinated hydrocarbon of a group comprising tetrafluoroethylene and trifluorochloroethylene. Preferably the polymer of tetrafluoroethylene is used. Granules 61 of such material which will pass through a screen having 40 mesh per inch have been found to operate satisfactorily.

While the trap 60 may take other forms, in the illustrated embodiment it comprises a plug of granules 61 closely packed between perforate discs 62 which, in turn, are held in place by rings 63. Rings 63 are pressed into the tube 55 and held in place by their frictional engagement with the inner periphery of the tube. One form of the invention having now been described in detail, the mode of operation is explained as follows:

For purposes of description it is assumed that the apparatus is manufactured, leak-tested, evacuated and charged with the refrigerant-absorbent solution. It is then ready to be shipped to the place where it is to be used as a self-contained package unit. During such shipment the unit may be tipped or tilted in such a way as to cause solution to flow from the separating chamber 52 through the riser 53 into the gas storage vessel 46. If the absorption solution is permitted to contact the palladium wall 54 it so contaminates or poisons the material as to prevent diffusion of hydrogen therethrough. In accordance with the present invention, however, any solution entering tube 55 from gas storage chamber 46 first engages the trap 60 containing the closely packed granules of a non-wetting material which resists the flow of solution therethrough so as to prevent the solution from contacting the palladium wall 56. On the other hand, gases such as hydrogen will flow freely through trap 60. As the material in trap 60 is non-wetting, all of the liquid absorbent will flow away from the trap when the unit is again tilted to its upright position. In other words, the material in trap 60 is impermeable to absorption solution but at all times permeable to hydrogen.

When the unit is mounted in its upright operative position at the place where it is to be used, the gas storage vessel 46 is located above the highest level to which solution rises during operation. Thus, in the upright operating position of the unit there is no danger of contacting the palladium wall 56 of the gas diffusing cell 54 with absorption solution. To initiate operation of the unit, steam at atmospheric pressure is supplied to the heating chamber 18 enclosing the upright tube 19. The heat of the steam is transmitted through the walls of the generator tubes 19 to expel refrigerant vapor, water, from absorption solution, lithium bromide, and the solution weak in refrigerant is raised to the separating chamber 21 by the expelled vapor. The refrigerant vapor is liquefied in the condenser 12 and thereafter flows through the orifice device 23 into the evaporator 13. Simultaneously, the absorption solution weak in refrigerant flows by gravity through the solution circuit into absorber 14. The absorption of refrigerant vapor into solution in the absorber 14 reduces the vapor pressure of the refrigerant in the evaporator 13 to cause it to evaporate at a low temperature and produce refrigeration. The solution strong in refrigerant then flows through the solution circuit back into the inlet chamber 20 of the generator 11 to complete a circuit.

During operation of the unit non-condensable hydrogen gas is continually transferred from the active parts of the apparatus to the gas storage vessel 46. Hydrogen occurring in the generator 11 and condenser 12 is swept by refrigerant vapor to the outlet from the condenser and flows through the orifice device 23 into the evaporator 13. Hydrogen in the evaporator 13 and absorber 14 is swept by the refrigerant vapor to the center and bottom of the absorber where turbulence is at a minimum. The hydrogen is then withdrawn from the absorber 14 through the suction tube 50 into the auxiliary absorber 47 of the purging device 45 and the gases are continually transferred through the fall tube pump 51 to the separating chamber 52. The hydrogen then rises through the conduit 53 into the gas storage chamber 46 and the liquid absorbent flows from the separating chamber through the conduit 40 to the generator 11. Hydrogen freely flows through the tube 55 and trap 60 therein into the cell 54 and diffuses through the palladium wall 56 to the ambient atmosphere. The interstices between the adjacent granules 61 of the non-wetting material in trap 60 provide sufficient area to permit hydrogen to flow from the storage vessel 46 to the diffusion cell 54 at a faster rate than the hydrogen diffuses through the palladium wall 56.

It will now be observed that the present invention provides a trap between the palladium wall and other parts of the apparatus which is permeable to hydrogen and impermeable to liquid absorbent. It will also be observed that the present invention provides a trap of the type indicated having closely packed granules of a non-wetting material which resists the penetration of liquids therethrough. It will still further be observed that the present invention provides a trap of the type indicated which is of simple and compact construction, economical to manufacture and reliable in performing its intended function.

While a single embodiment of the invention is herein illustrated and described, it will be understood that modifications may be made in the construction and arrangement of elements without departing from the spirit or scope of the invention. Therefore, without limitation in this respect, the invention is defined by the following claims.

I claim:

1. In a closed refrigerating apparatus containing a liquid and in which hydrogen is apt to occur, means for transferring the hydrogen from the active parts of the apparatus into contact with a palladium wall through which it diffuses to the ambient atmosphere, and a trap between the active parts of the apparatus and the palladium wall which is permeable to hydrogen and impermeable to liquid.

2. In a closed refrigerating apparatus in accordance with claim 1 in which the trap comprises closely packed granules of a non-wetting material that resists the flow of liquid and permits flow of hydrogen therethrough.

3. In a closed refrigerating apparatus in accordance with claim 1 in which the trap comprises closely packed granules of a non-wetting polymer of a fluorinated hydrocarbon.

4. In a closed refrigerating apparatus in accordance with claim 1 in which the trap comprises closely packed granules of a non-wetting polymer of tetrafluoroethylene.

5. In a closed refrigerating apparatus in accordance with claim 1 in which the trap comprises closely packed granules of a non-wetting polymer of trifluorochloroethylene.

6. In a vacuum type absorption refrigerating apparatus utilizing water as a refrigerant and a lithium bromide solution as an absorbent and in which hydrogen is apt to occur, a gas storage vessel, means for transferring hydrogen from the other parts of the apparatus to the gas storage vessel, a palladium wall communicating with the gas storage vessel through which hydrogen diffuses to the ambient atmosphere, and a trap in the connection between the palladium wall and liquid containing parts of the apparatus comprising closely packed granules of a non-wetting material which is permeable to hydrogen and impermeable to liquid absorbent.

7. In a vacuum type absorption refrigerating apparatus utilizing water as a refrigerant and lithium bromide solution as an absorbent and in which hydrogen is apt to occur, a gas storage vessel, means for transferring hydrogen from the other parts of the apparatus to the gas storage vessel, a tube having one end open at the interior of the vessel and a cell at its opposite end at the exterior of the vessel, said cell having a palladium wall through which hydrogen diffuses to the ambient atmosphere, and a plug in the tube between the storage vessel and cell of a material permeable to hydrogen and impermeable to liquid absorbent.

References Cited in the file of this patent

UNITED STATES PATENTS

| 1,174,631 | Snelling | Mar. 7, 1916 |
| 2,320,349 | Cropper | June 1, 1943 |
| 2,374,564 | Reid | Apr. 24, 1945 |
| 2,627,933 | Teter | Feb. 10, 1953 |

OTHER REFERENCES

Industrial and Engineering Chemistry, September 1946, pp. 871–877.

Pulp and Paper Magazine of Canada, December 1950, p. 27.

Analytical Chemistry, volume 22, p. 15A, April 1950.